(12) United States Patent
Jager et al.

(10) Patent No.: US 12,093,643 B1
(45) Date of Patent: Sep. 17, 2024

(54) SYSTEMS AND METHODS FOR USE OF DIGITAL UNDERLAYMENT

(71) Applicant: ZUMEDIA INC., New York, NY (US)

(72) Inventors: Phyllis Jager, New York, NY (US);
Barry Terach, New York, NY (US);
Mark Cuban, New York, NY (US)

(73) Assignee: ZUMEDIA INC., New York, NY (US)

( * ) Notice: Subject to any disclaimer, the term of this patent is extended or adjusted under 35 U.S.C. 154(b) by 0 days.

(21) Appl. No.: 18/198,224

(22) Filed: May 16, 2023

(51) Int. Cl.
*G06F 40/186* (2020.01)
*G06F 40/14* (2020.01)

(52) U.S. Cl.
CPC .......... *G06F 40/186* (2020.01); *G06F 40/14* (2020.01)

(58) Field of Classification Search
CPC ...... G06F 40/169; G06F 40/14; G06F 40/166; G06F 40/186
See application file for complete search history.

(56) References Cited

U.S. PATENT DOCUMENTS

| | | | |
|---|---|---|---|
| 8,375,305 B1* | 2/2013 | Strand | G06F 3/0488 715/745 |
| 9,280,266 B2* | 3/2016 | Chae | G06F 3/0484 |
| 10,073,861 B2* | 9/2018 | Shamir | G06F 40/186 |
| 2003/0160824 A1* | 8/2003 | Szumla | G06T 11/60 715/769 |
| 2011/0071861 A1* | 3/2011 | Qian | G06Q 30/0276 705/5 |
| 2014/0195921 A1* | 7/2014 | Grosz | G06Q 30/0631 715/738 |
| 2017/0199847 A1* | 7/2017 | Lanahan | G06T 11/60 |
| 2017/0309255 A1* | 10/2017 | Deguzman | G06F 9/451 |
| 2021/0312096 A1* | 10/2021 | Bowen | G06F 40/186 |

OTHER PUBLICATIONS

Advance Ads: How to integrate Background Ads or Skin Ads into WordPress, Dec. 18, 2020, pp. 1-5 https://web.archive.org/web/20201218133118/https://wpadvancedads.com/manual/background-skin-ads-placement/ (Year: 2020).*

* cited by examiner

*Primary Examiner* — Scott T Baderman
*Assistant Examiner* — Mario M Velez-Lopez
(74) *Attorney, Agent, or Firm* — Tarter Krinsky & Drogin LLP (57) ABSTRACT

A method comprising identifying content to underlay digital content of a display, displayed through a user interface creating a temporary array; populating a temporary array with the identified content for underlayment; and responsive to an input, transforming the temporary array into a populated digital underlayment. The content can be one or more of the following: video, text, static image, ticker, live video, live stream, recorded stream, live broadcast, or recorded broadcast. The display can be a webpage of an online marketplace, social media site, or website.

14 Claims, 6 Drawing Sheets

SYSTEMS AND METHODS FOR USE OF DIGITAL UNDERLAYMENT

FIELD OF THE DISCLOSURE

The present disclosure relates to exemplary embodiments of systems and methods for providing the use of a digital underlayment, and more particularly, to exemplary embodiments of systems and methods for providing content on underlayments of webpages or device backgrounds, and selling or renting of the underlayment.

BACKGROUND

A webpage is a file written in hypertext that can be visited online using a web browser. This is typically done on the Internet. Webpages alone or combined together comprise websites, social media platforms, and other platforms on the Internet. Webpages typically include text, photos, links, and other content. All webpages have a viewable background commonly called wallpaper, but this can also be called a backskin or underlayment. Underlayment are also found on devices and screens that are not webpages but are viewed as backgrounds and on any digital member/user account space or profile that contains an underlayment which may be used as space for content creation. These backgrounds are included herein as underlayment.

Online marketplaces, social media sites, websites, and other online platforms allow content publishers to create webpages that visitors can visit, e.g., a content publisher of a social media platform is provided with a web address that points to the content publisher's social media webpages hosted on the platform, and which can be distributed to third-parties and visited by third-parties. Each of the webpages comprises an underlayment, which can be blank or contain content. As used herein, a content publisher is an entity or person that publishes its own or some other content on webpages or its comparable, e.g. member/user account space, device background; an online platform or webpage owner is an entity or person that owns or controls the use of a webpage or its comparable, e.g. member/user account space, device background; a visitor is an entity or person that views or experiences a webpage or its comparable, e.g. member/user account space, device background; a content creator is an entity or person that provides content to publish on a webpage or its comparable, e.g. member/user account space, device background. Each, or any, of these categories can be the same entity or person or a different entity or person.

SUMMARY

Online platforms or other types of webpage owners can provide content publishers with webpages that allow a content publisher to underlay digital video or other digital content on the webpages as underlayment. A visitor can navigate to a content publisher's webpage to view specific content, e.g., photographs of the content publisher, comments of the content publisher. The content publisher that publishes on the webpage can provide, or allow a content creator (e.g., a tire manufacturer that sells a unique spare tire) to provide a video, or other content, that can underlay at least some of a content publisher's webpage's other content, e.g., the content publisher's photographs or comments. The video or other content can play or appear underneath the content publisher's other content but remain visible where there is no other content or where the other content is partially transparent.

The underlayment can comprise any type of user interface element (e.g., a HyperText Markup Language (HTML) element of HTML5 that uses <canvas> tags, which may be contained in <div> tags), that can underlay another user interface element of a webpage.

In accordance with the present disclosure, a method is disclosed comprising identifying content to underlay the content of a webpage displayed through a user interface; creating a temporary array; populating the temporary array with the identified content for underlayment; responsive to an input, transforming the temporary array into the webpage underlayment.

The content can be a video, text, static image, ticker, live video, live or recorded streams, live or recorded broadcasts, or other known content types.

The underlayment can be a single element, such that when the visitor clicks anywhere on the underlayment, a click event can occur without consideration of where the visitor clicked (e.g., indicating that the visitor has an interest in the tire, and thus may desire to visit the tire website) or on a portion within the underlayment (e.g., indicating that the visitor is not interested in the tire, and would like the content to be removed). The underlayment can comprise multiple elements, some, or all of which can be clicked on to control, provide, or activate rules. The content publisher can specify multiple rules based on certain clicks of the underlayment including, e.g., the video underlayment transitions to stop playing, the visitor is taken to another webpage, a pop-up or overlayment appears.

The underlayment can be sold or rented by the owner of the webpage or the content publisher to one or more content creators.

A method is disclosed comprising identifying content to underlay the content of a webpage displayed through a user interface; creating a temporary array; populating the temporary array with the identified content for underlayment; responsive to an input, transforming the temporary array into the populated webpage underlayment.

A computer device is disclosed comprising: a processor; and memory comprising processor-executable instructions that when executed by the processor cause performance of operations, the operations comprising: identifying content to underlay the content of a webpage displayed through a user interface; creating a temporary array; populating the temporary array with the identified content for underlayment; responsive to an input, transforming the temporary array into the populated webpage underlayment.

A non-transitory machine readable medium is disclosed having stored thereon processor-executable instructions that when executed cause performance of operations, the operations comprising: tracking a position of a pointer; and responsive to receiving an input while the position of the pointer corresponds to a position on the underlayment through which a video is rendered: coordinates of the position of the pointer are transformed into a lookup value; rules are applied based on the value of the array position of the underlayment and the lookup value.

DETAILED DESCRIPTION OF EXEMPLARY EMBODIMENTS OF DISCLOSURE

Subject matter will be described more fully herein with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted or may be handled in summary fashion.

The following subject matter can be embodied in a variety of different forms, such as methods, devices, components, or systems. Accordingly, this subject matter is not intended to be construed as limited to any example embodiments set forth herein. Rather, example embodiments are provided merely to be illustrative. Such embodiments can, e.g., take the form of hardware, software, firmware, or any combination thereof.

Figure 1:
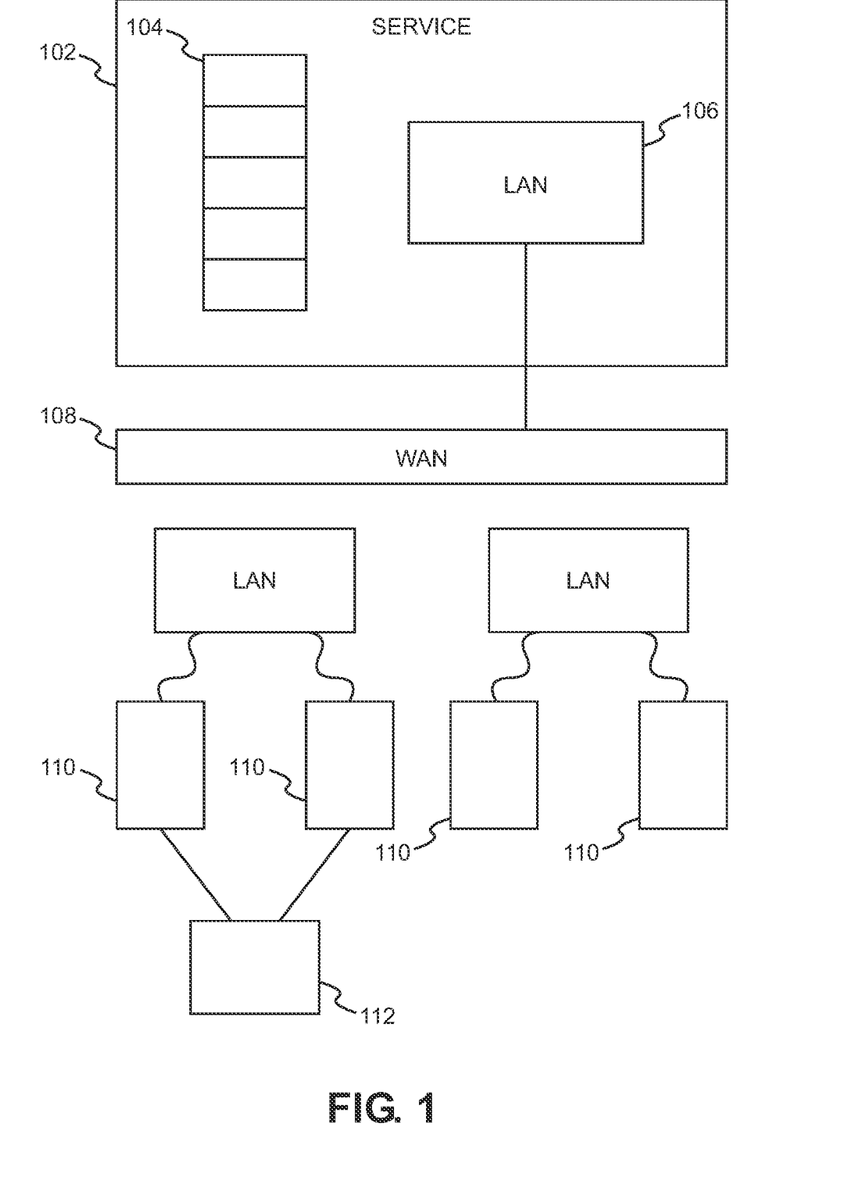
FIG. 1 is an example of a network that connects visitors to servers.

FIG. 1 is an interaction diagram of an embodiment 100 illustrating a service 102 provided by a set of servers 104 to a set of client devices 110 via various types of networks. The servers 104 or client devices 110 can be capable of transmitting, receiving, processing, or storing many types of signals, such as in memory as physical memory states.

The servers 104 of the service 102 can be internally connected via a local area network 106 (LAN), e.g. a wired network where network adapters on the respective servers 104 are interconnected via cables (e.g., coaxial or fiber optic cabling), and can be connected in various topologies (e.g., buses, token rings, meshes, or trees), or a wireless network, e.g. satellite, Wi-Fi, Bluetooth. The servers 104 can be interconnected directly, or through one or more other networking devices, such as routers, switches, or repeaters. The servers 104 can utilize a variety of physical networking protocols (e.g., Ethernet or Fiber Channel) or logical networking protocols (e.g., variants of an Internet Protocol (IP), a Transmission Control Protocol (TCP), or a User Datagram Protocol (UDP). The local area network 106 can include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 can be organized according to one or more network architectures, such as server/client, peer-to-peer, or mesh architectures, or a variety of roles, such as administrative servers, authentication servers, security monitor servers, data stores for objects such as files and databases, business logic servers, time synchronization servers, or front-end servers providing a user/visitor-facing interface for the service 102.

The local area network 106 can comprise one or more sub-networks, such as can employ differing architectures, can be compliant or compatible with differing protocols or can interoperate within the local area network 106. Additionally, a variety of local area networks 106 can be interconnected, e.g., a router can provide a link between otherwise separate and independent local area networks 106.

As shown in FIG. 1, the local area network 106 of the service 102 is connected to a wide area network 108 (WAN) that allows the service 102 to exchange data with other services 102 or client devices 110. The wide area network 108 can encompass various combinations of devices with varying levels of distribution and exposure, such as a public wide-area network (e.g., the Internet) or a private network (e.g., a virtual private network (VPN) of a distributed enterprise).

As shown in FIG. 1, the service 102 can be accessed via the wide area network 108 by a visitor 112 of one or more client devices 110, such as a portable media player (e.g., a portable gaming device); a portable communication device (e.g., a camera, a phone, a wearable device, an implantable device, or a text chatting device); a virtual reality output device, a workstation; or a laptop form factor computer. The respective client devices 110 can communicate with the service 102 via various connections to the wide area network 108. As a first example, one or more client devices 110 can comprise a cellular communicator and can communicate with the service 102 by connecting to the wide area network 108 via a wireless local area network 106 provided by a cellular provider. As a second such example, one or more client devices 110 can communicate with the service 102 by connecting to the wide area network 108 via a wireless local area network 106 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the servers 104 and the client devices 110 can communicate over various types of networks. Other types of networks that can be accessed by the servers 104 or client devices 110 include mass storage, such as network attached storage (NAS), a storage area network (SAN), or other forms of computer or machine-readable media.

Figure 2:
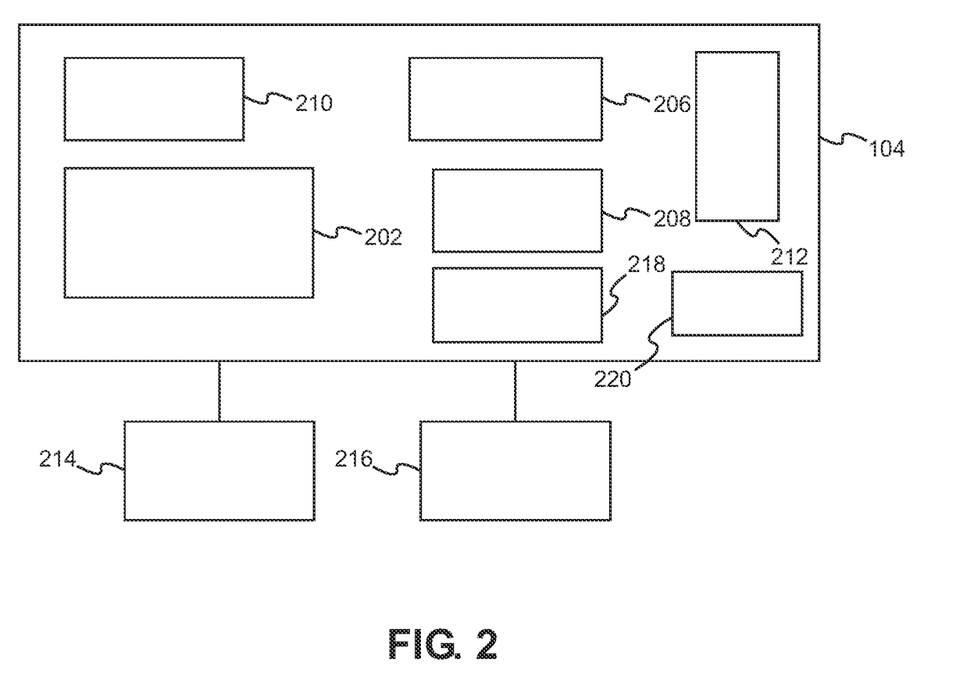
FIG. 2 is an example of a server that can be used with the technology disclosed herein.

FIG. 2 is a schematic architecture diagram 200 of an example of a server 104 that can utilize at least a portion of the techniques provided herein. Such a server 104 can vary widely in configuration or capabilities, alone or in conjunction with other servers, in order to provide a service such as the service 102.

The server 104 can comprise one or more processors 210 that process instructions. The one or more processors 210 can optionally include a plurality of cores; one or more coprocessors, such as a mathematics coprocessor or an integrated graphical processing unit (GPU); or one or more layers of local cache memory. The server 104 can comprise memory 202 storing various forms of applications, such as an operating system 204; one or more server applications 206, such as a hypertext transport protocol (HTTP) server, a file transfer protocol (FTP) server, or a simple mail transport protocol (SMTP) server; or various forms of data, such as a database 208 or a file system. The server 104 can comprise a variety of peripheral components, such as a wired or wireless network adapter 214 connectible to a local area network or wide area network; one or more storage components 216, such as a hard disk drive, a solid-state storage device (SSD), a flash memory device, or a magnetic or optical disk reader.

The server 104 can comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; or Small Computer System Interface (SCI) bus protocol. In a multibus embodiment, a communication bus 212 can interconnect the server 104 with at least one other server. Other components that can optionally be included with the server 104 (though not shown in the schematic architecture diagram 200 of FIG. 2) include a display; a display adapter, such as a graphical processing unit (GPU); input peripherals, such as a keyboard or mouse; and a flash memory device that can store a basic input/output system (BIOS) routine that facilitates booting the server 104 to a state of readiness.

The server 104 can operate in various physical enclosures. The server 104 can be mounted horizontally or in a cabinet or rack, or can simply comprise an interconnected set of components. The server 104 can comprise a dedicated or shared power supply 218 that supplies or regulates power for the other components. The server 104 can provide power to or receive power from another server or other devices. The server 104 can comprise a shared or dedicated climate control unit 220 that regulates climate properties, such as temperature, humidity, or airflow. Many such servers 104 can be configured or adapted to utilize at least a portion of the techniques presented herein.

Figure 3:
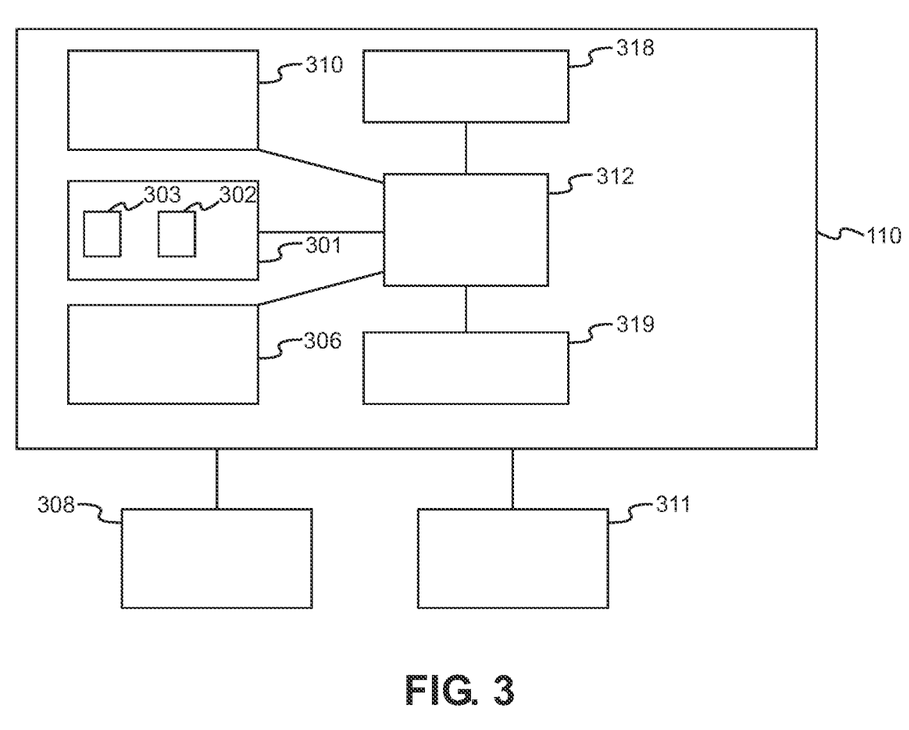
FIG. 3 is an example of a device that can be used with the technology disclosed herein.

FIG. 3 presents a schematic architecture diagram 300 of an example of a client device 110 whereupon at least a portion of the techniques presented herein can be implemented. Such a client device 110 can vary widely in configuration or capabilities, in order to provide a variety of functionality to a user such as the visitor 112. The client device 110 can be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, an implantable device, any of these devices integrated with an article of clothing; and/or a component of a piece of furniture, such as a tabletop, and/or of another device, such as a vehicle or residence. The client device 110 can serve the user in a variety of roles, such as a workstation, kiosk, media player, gaming device, and/or appliance.

The client device 110 can comprise one or more processors 310 that process instructions. The one or more processors 310 can optionally include a plurality of cores; one or more coprocessors, such as a mathematics coprocessor or an integrated graphical processing unit (GPU); and/or one or more layers of local cache memory. The client device 110 can comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 can comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that can optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that can store a basic input/output system (BIOS) routine that facilitates booting the client device 110 to a state of readiness; and a climate control unit that regulates climate properties, such as temperature, humidity, and airflow.

The client device 110 can comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 can comprise a dedicated and/or shared power supply 318 that supplies and/or regulates power for other components, and/or a battery 304 that stores power for use while the client device 110 is not connected to a power source via the power supply 318. The client device 110 can provide power to and/or receive power from other client devices.

In some embodiments, as a user 112 interacts with a software application on a client device 110 (e.g., social media platform and/or electronic mail application), descriptive content in the form of signals or stored physical states within memory (e.g., an email address, instant messenger identifier, phone number, postal address, message content, date, and/or time) can be identified. Descriptive content can be stored, typically along with contextual content, e.g., the source of a phone number (e.g., a communication received from another user via an instant messenger application) can be stored as contextual content associated with the phone number. Contextual content, therefore, can identify circumstances surrounding receipt of a phone number (e.g., the date or time that the phone number was received), and can be associated with descriptive content. Contextual content can be used to subsequently search for associated descriptive content, e.g. a search for phone numbers received from specific individuals, received via an instant messenger application or at a given date or time, can be initiated. The client device 110 can include one or more servers that can locally serve the client device 110 and/or other client devices of the user 112 and/or other individuals, e.g., a locally installed webserver can provide web content in response to locally submitted web requests. Many such client devices 110 can be configured and/or adapted to utilize at least a portion of the techniques presented herein.

One or more computing devices and/or techniques for monitoring images or videos are provided. A content publisher can provide visitors with content through user interfaces, such as a webpage provided through a web browser. The webpage can be a page from a social media account, a website or other type of webpage. The content publisher can provide an underlayment that the visitor can see and interact with. The content publisher or webpage owner can also allow another content publisher, such as a third-party content publisher, to underlay content on the webpage.

A click input event is provided on the underlayment that allows the visitor to indicate certain preferences, e.g., stop the video from playing, rewind, switch to a different video, visit a different webpage. The content publisher or online platform can specify rules that apply to use of the underlayment, e.g., the video cannot contain backlinks, allows/prohibits certain types of ads, allows for embedded backlinks, allows for editing a video (crop, configure for size, filter, add text overlay, adjust pixels).

Figure 4:
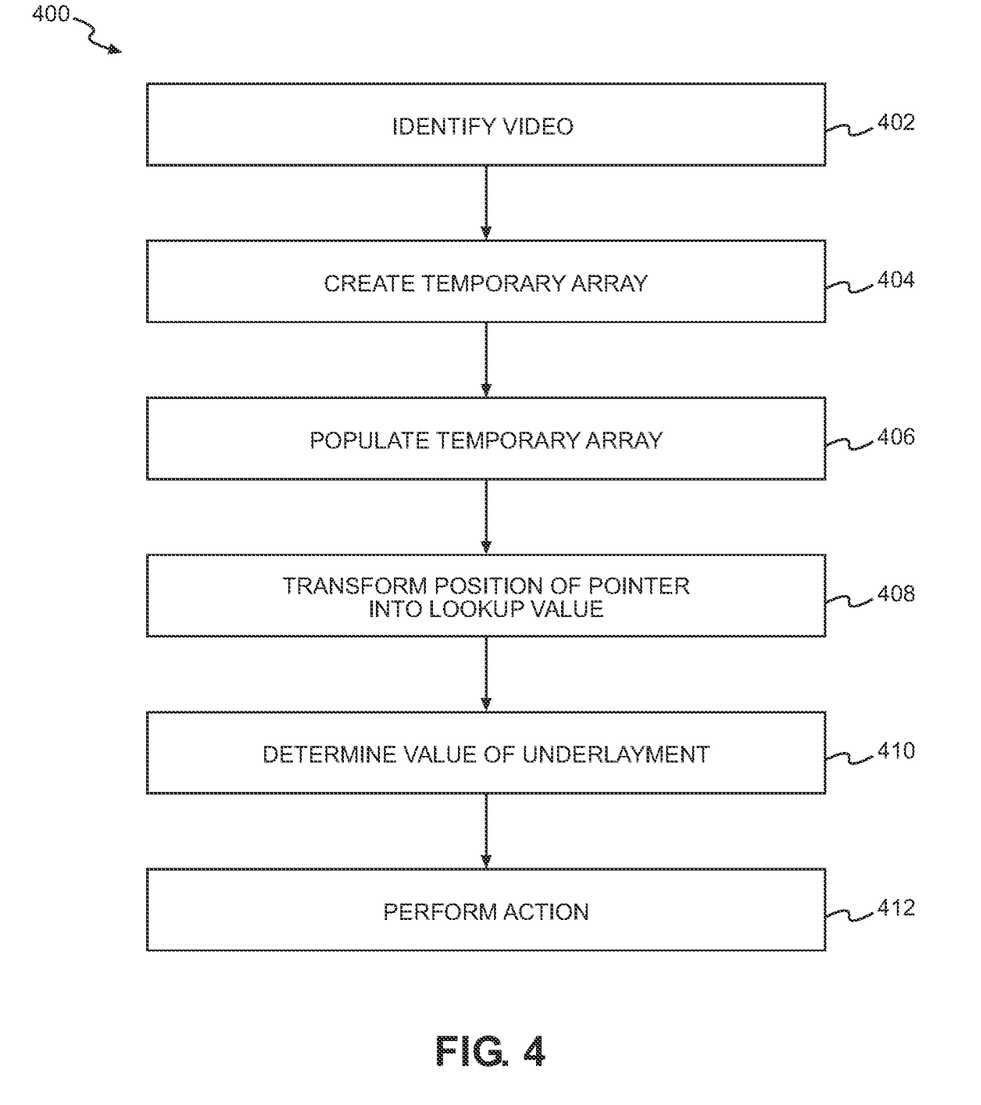
FIG. 4 is an example of how to monitor a video underlayment as disclosed herein.

An embodiment of monitoring a video underlayment is illustrated by an example method 400 of FIG. 4. A content publisher can provide visitors with access to content, such as a webpage, that is accessible through a user interface such as a web browser (e.g., a user can access a spare tire website). At 402, a video, being rendered within the underlayment of the webpage displayed through the user interface, can be identified. The underlayment can comprise any type of user interface element (e.g., a HyperText Markup Language (HTML) element of HTML5 that uses <canvas> tags, which can be contained in <div> tags), which can underlay another user interface element of a webpage At 404, a temporary array can be created. The temporary array can comprise a linear byte array within which the content publisher through a range of filters and preferences selects the categories of ads it will or will not accept so that the scope of ads that can be displayed on the underlayment is controlled. In one embodiment a content creator can also select to what types of profiles they want to post. At 406, the temporary array can be populated with the data of the video. Content publishers and content creators are matched based on filter parameters chosen by each or one or the other, e.g., an online influencer is matched with a content creator to promote certain goods that the influencer endorses. Filter parameters can include matching that increases potential or actual visitors to the webpage, or matching that makes advertising or marketing more effective.

At 406, the position of a pointer with respect to the underlayment can be tracked (e.g., or a touch display can be monitored to identify user input, such as a touch gesture, with respect to the canvas), e.g., the pointer pixel image (e.g., a 2×2 pixel image or any other number or grouping/shape of pixels) can be created to represent the position of the pointer. A location of the pointer pixel image can be updated based upon changes in position of the pointer.

Responsive to receiving a user input while the position of the pointer corresponds to a portion of the underlayment (e.g., or the user input corresponding to a touch gesture over the portion of the video), coordinates of the position of the pointer (e.g., or of the touch gesture) can be transformed into a lookup value, at 408, e.g. Cartesian coordinates of the position of the pointer can be transformed into a linear lookup value into the temporary array because the temporary array can comprise a linear array of certain values. At 410, a value of the underlayment is determined (e.g., position on the underlayment), at an array position in the temporary array corresponding to the lookup value, can be identified. Certain rules will apply based on the value of the array position of the underlayment and the lookup value.

At 412, responsive to the underlayment value, a first action can be performed, e.g., click on the video underlayment or a certain place of the video underlayment, a sound is played, the video goes into motion, the visitor is redirected to another webpage, an image of the visitor is incorporated into the identified content for underlayment. The underlayment can be responsive to user input on all areas or on only certain portions.

In an exemplary embodiment, a webpage underlayment can be created by these steps:

Choose an image or video that is desired to use as your webpage underlayment. Save the image or video so that it can be accessed. Open an HTML file and create a new CSS section. This can be done by adding a <style> tag in the <head> section of an HTML file. In the CSS section, create a new class or ID that can be used to apply the underlayment to the webpage, e.g., create a class called "wallpaper" or "underlayment", or an ID called "background". Set the background property of the class or ID to the URL of the wallpaper image/video. This can be done using the background-image property in CSS, e.g., if the image is named "wallpaper.jpg" and is located in the same directory as the HTML file, the following code can be used: .wallpaper {
  background-image: url('wallpaper.jpg');
}

Apply the class or ID to the element that is desired as the wallpaper. This could be the entire webpage or a specific section of the page, e.g., for the wallpaper to cover the entire page, add the class to the <body> element: <body class="wallpaper">
</body>

Save the HTML file and open it in a web browser to view the underlayment.

The exemplary embodiments and any other methods for creating webpage underlayment can be used within a system and method for providing online advertising on the webpage, e.g., once a user creates a social media account, a background or portion of the webpage associated with the user can provide for digital content sponsored or paid by a third party. Exemplary embodiments of the various methods and apparatuses will now be described with reference to the figures. The following description of the various embodiments is merely exemplary in nature and is in no way intended to limit the scope of the disclosure, its application, or uses.

The exemplary embodiments of the present disclosure provide for a system and method that can provide multiple sources of revenue for a content publisher, e.g., a company can own a domain or can own webpages that can provide for, e.g., a social media network which multiple content publishers can join. Each content publisher can have their own unique webpage or set of webpages on the company's domain with a unique URL, that will include, e.g., the company domain name. Content publishers can connect with or follow each other, such as friends, or coworkers, or celebrities. Each content publisher's unique webpages can display various information the content publisher wants to show (e.g., name, birth date, education, mailing address, email address, web site, occupation, company name, number of followers, etc.). Also included can be any digital content the content publisher wants to show, such as a news feed timeline where they can post information which can indicate a time stamp of when it was posted.

Each content publisher can have underlayment on the webpage. Such underlayment can be of various sizes and positions on each webpage, including the entire webpage. The webpage owner can allow the content publisher to put any digital content on the underlayment, which can be static or dynamic, such as an image, a series of images or a video. In some exemplary embodiments, a user can "rent" the underlayment from a content publisher for advertising or other reasons, e.g., if a content publisher has a significant number of followers, such as if the content publisher is, e.g., an actor, musician, athlete, influencer, etc., a third-party company can be interested in advertising on that particular content publisher's webpage. Such advertisement can be provided in the underlayment. The company which owns the domain, or the webpage owner can provide the software for allowing use of the underlayment.

A user can control access to the underlayment, and other settings for use of the underlayment, e.g., a content publisher can choose to allow or not allow a content creator to advertising on their underlayment. The user can choose to only allow certain types of advertising or not allow certain type of advertising, e.g. an athlete cannot allow any type of sneaker advertising if they already have an affiliation with a sneaker company, or a politician cannot want any type of religious advertising. A model can want to allow only certain advertising, such as clothing. Such control can be provided by the company that owns the domain or the webpage owner to each content publisher to identify what type of advertising they will allow or not allow. In some exemplary embodiments, the content publisher will receive a notification if a content creator chooses to place an ad, and the content publisher can review and accept or reject such ad after reviewing various information, such as the name of the content creator, the advertisement being placed, and the amount offered.

The company that owns the domain or the webpage owner can set a price for such advertisements, or the content publisher can set a price. In some exemplary embodiments, the company that owns the domain or the webpage owner can provide software allowing the content publisher to set their price for advertisement, or they can review and accept/reject an offer by a content creator. In some exemplary embodiments, certain time slots can be set up for bidding for advertisements by various content creators. The company that owns the domain or the webpage owner can set a minimum price or maximum price for any content publishing. In some exemplary embodiments, the company that owns the domain or the webpage owner can provide software allowing the user to set a minimum or maximum price for advertising on the underlayment.

The webpage owner and the content publisher can share the revenue generated by the advertising, e.g. if the content creator pays one thousand dollars for a ten second time slot to run an advertisement on the content publisher's underlayment, the company that owns the domain or the webpage owner can retain ten percent of the revenue and the content publisher can receive the remaining amount. In some exemplary embodiments, the content creator can pay the webpage owner, and the webpage owner can pay the content publisher.

The underlayment can be rented by different time domains, e.g. by the day, hour, minute, second, day of the week, day of the year, all can be set by the webpage owner or a user, such as periods of ten seconds, e.g. the webpage owner can provide software allowing the content publisher to set a time period for each time slot it wants to allow advertising (e.g., ten second periods or 30 second periods). The content creator that wants to advertise on the content publisher's webpage can choose as many available time slots as available, e.g., a first content creator can lease multiple time slots on a content publisher's webpage for advertising, and a second content creator wanting to advertise on the same content publisher's underlayment can lease the remaining time slots. The software run by the webpage owner can show to any content creator what remaining time slots are available for advertising.

The advertisement can be static or dynamic, such as an image, images, streaming content, or a video, that can run on the underlayment for the time slot that is paid for. The time slot can be chosen for certain days of the week (or month or year), time of the day, etc., e.g., if an advertisement is for 60 seconds, a content creator can purchase six 10 second time slots (for as many periods as it wants in a particular day). That is, the content creator can choose to run this 60 second advertisement once every hour on a content publisher's webpage. The software on the webpage can allow the content publisher to block off certain time slots if it prefers to run its own content.

Figure 5:
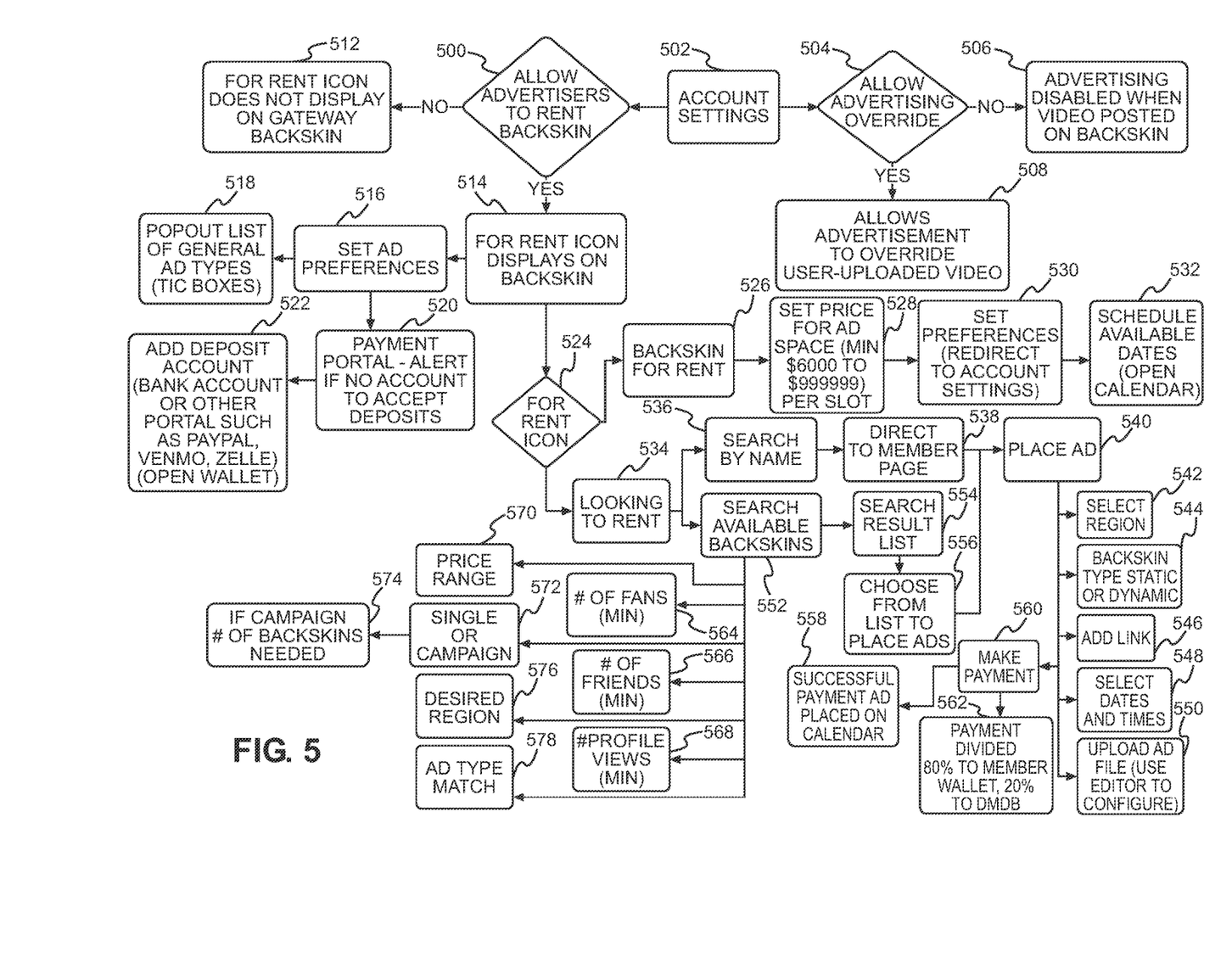
FIG. 5 is an illustration of an embodiment involving various examples of the ability to rent the underlayment for the publication of content.

FIG. 5 illustrates an example of a flowchart according to the exemplary embodiments of the present disclosure, e.g., each content publisher can have account settings 502 for their webpage on the domain provided by the webpage owner.

The account settings 502 allow content creators to rent/lease/license the underlayment at 510. If the content publisher does not allow renting, then a rent icon does not appear on the content publisher's webpage at 512. If they do allow renting, then a rent icon can appear on the content publisher's webpage for the rental of the underlayment area at 514. The content publisher can set their ad preferences at 516 and can select from a popout list of general ad types at 518. The content publisher can select various categories of advertising they will allow or not allow, and set their pricing. These controls are provided by the software that can be provided by the webpage owner. A payment portal can appear for each content publisher the first time at 520, and they can enter their payment information or account information on which they want to be paid by a content creator at 522.

Sometimes, a content publisher can have their own digital content on their underlayment such as an image, video or their own ad (e.g., for their own company). If the content publisher prefers to make money through advertising, the content publisher can allow an advertising override 504, allowing a content creator to take over the underlayment. If advertising override is not allowed, then the advertising is disabled 106 when the content publisher posts their own content on their underlayment. If an advertisement override is allowed, then the software allows the advertisement to override the user uploaded content at 108.

The "for rent" icon at 524, allows for the renting of the underlayment 526. The content publisher, or in another example the webpage owner, can set the price for ad space at 528 (e.g., per time slot). The content publisher can set the preferences at 530 (can redirect to account settings at 502) and can schedule available dates and times for the rental of the underlayment at 532. The "for rent" icon 524 indicates that particular content publisher is looking to rent the underlayment at 534. A content creator such as an advertiser can search by a content publisher's name at 536 and can be directed to the content publisher's page at 538 to place an ad at 540. The content creator can also search for available underlayments at 552 and view a search result list at 554. The search of available underlayments at 552 can be based on one or more factors that the content creator can choose from, such as a price range 570, a number of followers of the content publisher 564, whether the content creator wants to advertise on a single content publisher or a plurality of content publishers at one time (e.g., campaign) at 572 (if a campaign, then the number of underlayments needed can be indicated at 574), a number of friends of the content publisher 566, a number of profile views 568, a desired region where the content publishers can be 576 or an ad type match 578 such as a specific category the content publisher chose. The search 552 can provide the search result list at 554. The content creator can choose from this list to place ads at 556, and then place the ad at 540.

The content creator can select a region at 542, e.g. an advertiser can choose to only show ads for a specific location (e.g., North America), so only visitors in North America see the ad on the particular content publisher's webpage. This allows other advertisers to advertise in other geographic areas with the same content publisher, and even at the same time. The advertiser can choose an underlayment type (static or dynamic) at 544, add a link at 546 (e.g., a link to the advertiser's own website so if someone clicks the ad on the underlayment, it takes them to that URL). The advertiser can select dates and times to place the ad at 548, and then upload the ad file, e.g., by activation of an upload button, at 550 for display on the content publisher's underlayment area. The advertiser can then make a payment at 560, and the ad can be placed on the calendar to be displayed upon successful completion of the payment at 558. The payment can be divided at 562 (e.g., 80% to the content publisher paid to the account established at 522, and 20% to the webpage owner).

Figure 6:
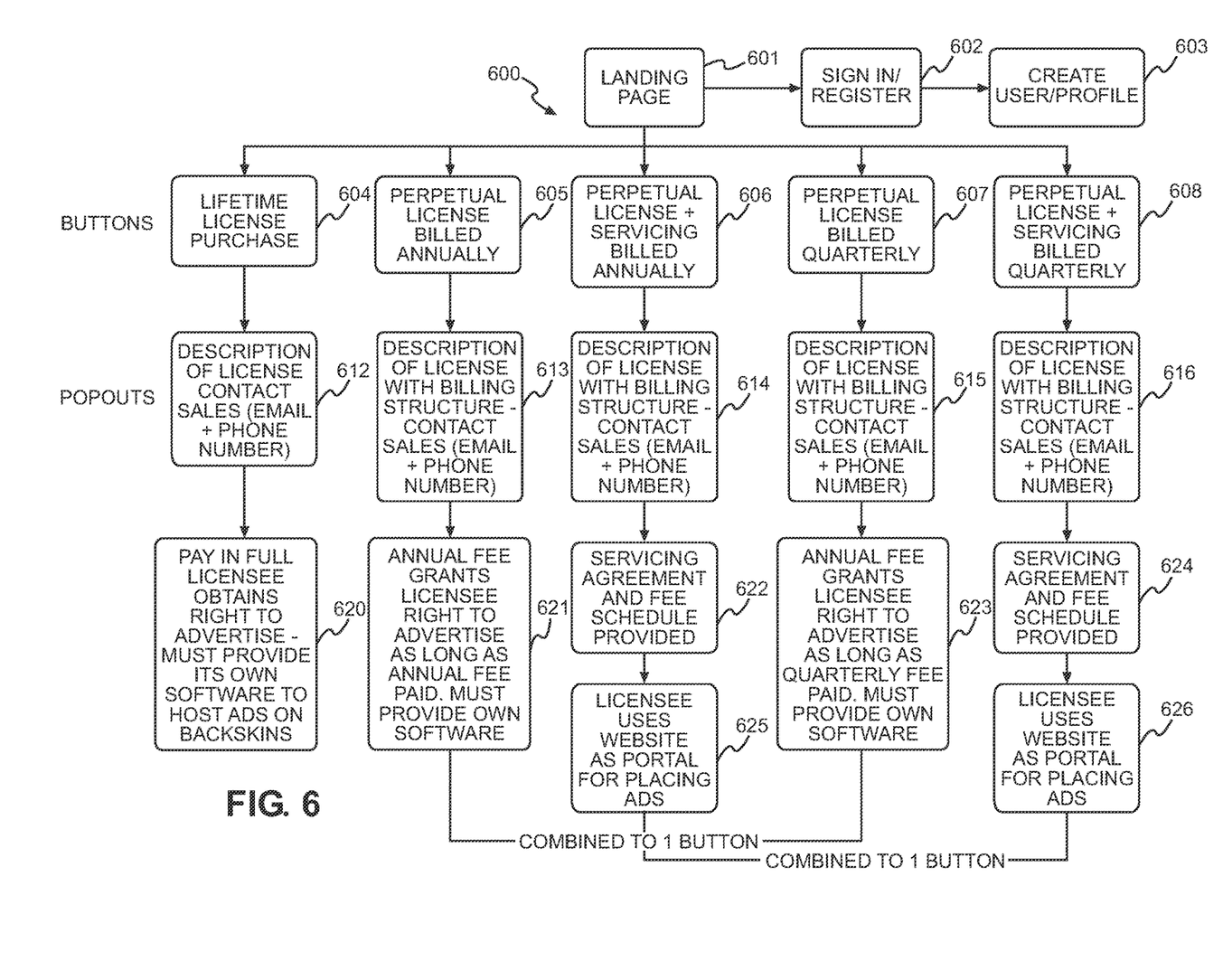
FIG. 6 is an embodiment showing an example configuration of how a user can purchase rights to load content as an underlayment.

In FIG. 6 an embodiment of licensing an underlayment 600 is provided. A user lands on a landing webpage 601. The user can sign into an existing account that allows for control of the webpage underlayment or register for a new account 602. The user can create a user profile 603. The user profile can be controlled by certain rules, e.g., requiring a certain age limit, requiring credit card information, controlling types of content allowed for an underlayment. The landing page 601 provides buttons that offer certain license arrangements that can be chosen 604-608.

The Lifetime License Purchase button 604 provides a popout 612 that describes the applicable license agreement, contact information related to the content publisher and other information related to the content publisher. A rule 620 that can apply to this type of license is, if payment is made in full, the content creator can post advertisements as an underlayment but it must provide its own software to host ads on the underlayment.

The Perpetual License Billed Annually button 605 provides a popout 613 that describes the applicable license agreement including the billing structure, contact information related to the content publisher and other information related to the content publisher. A rule 621 that can apply to this type of license is, if payment is made in full, the content creator can post advertisements as an underlayment, but it must provide its own software to host ads on the underlayment.

The Perpetual License+Servicing Billed Annually button 606 provides a popout 614 that describes the applicable license agreement including the billing structure, contact information related to the content publisher and other information related to the content publisher. In the same popout or a separate popout 622, a service agreement and fee schedule can be provided. A rule 625 that can apply to this type of license is, the content creator can post advertisements as an underlayment using software provided by the webpage owner or a third-party working with the webpage owner to host ads on the underlayment.

The Perpetual License Billed Quarterly button 607 provides a popout 615 that describes the applicable license agreement including the billing structure, contact information related to the content publisher and other information related to the content publisher. A rule 623 that can apply to this type of license is, if payment is made in full, the content creator can post advertisements as an underlayment, but it must provide its own software to host ads on the underlayment.

The Perpetual License+Servicing Billed Quarterly button 608 provides a popout 616 that describes the applicable license agreement including the billing structure, contact information related to the content publisher and other information related to the content publisher. In the same popout or a separate popout 624, a service agreement and fee schedule can be provided. A rule 626 that can apply to this type of license is, the content creator can post advertisements as an underlayment using software provided by the webpage owner or a third-party working with the webpage owner to host ads on the underlayment.

Various considerations can also be addressed in the exemplary applications described according to the exemplary embodiments of the present disclosure, e.g., the software can be built into any domain platform. Various advertising methods can be used, such as various time slots, time periods, days of the week/month/year, and various pricing can be set for different time periods. A bid system can be used for content creators wanting the same underlayment during the same time period. Each content creator or the webpage owner can have various account settings allowing them to choose if advertising is allowed, the period of the time slot, prices for the advertisements, categories of advertising allowed on each webpage, providing for or an image of the visitor to be incorporated into the identified content for underlayment. In some exemplary embodiments, the webpage owner or content publisher can set these amounts or have a default setting (e.g., based on the number of followers for a content publisher).

As used in this application, "component," "module," "system", "interface", and/or the like are generally intended to refer to a computer-related entity, either hardware, a combination of hardware and software, software, or software in execution, e.g., a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc., e.g., a first object and a second object generally correspond to object A and object B or two different or two identical objects or the same object.

Moreover, "example" and "e.g.," is used herein to mean serving as an example, instance, illustration, etc., and not necessarily as advantageous. As used herein, "user" can be a content creator, a content publisher, or a visitor. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A method comprising:
    identifying content to underlay webpage content of a webpage displayed through a user interface;
    creating a temporary array;
    populating the temporary array with the identified content for underlayment;
    responsive to an input, transforming the temporary array into a populated webpage underlayment;
    tracking the position of a pointer with respect to the populated underlayment; and
    renting the underlayment to a content creator, wherein the underlayment is rented by a time domain, and
    wherein, responsive to receiving an input while the position of the pointer corresponds to a portion of the populated underlayment, transforming coordinates of the position of the pointer into a lookup value, identifying a value of the populated underlayment corresponding to the lookup value, and performing an action upon the webpage responsive to a rule associated with the identified value of the populated underlayment.

2. The method of claim 1 wherein the content is one or more of the following: video, text, static image, ticker, live video, live stream, recorded stream, live broadcast, or recorded broadcast.

3. The method of claim 1 wherein the webpage is a webpage of an online marketplace, social media site, or website.

4. The method of claim 1 wherein the time domain is a day, hour, minute, or second.

5. The method of claim 1 wherein the action performed comprises incorporating onto the content an image of a visitor viewing the webpage.

6. The method of claim 1 wherein the populated underlayment is populated by one or more of the following: video, text, static image, ticker, live video, live stream, recorded stream, live broadcast, or recorded broadcast.

7. The method of claim 6 wherein the rule associated with the identified value of the populated underlayment is one or more of the following: the populated underlayment stops playing; the visitor is taken to another webpage; an overlayment appears; or an image of the visitor is incorporated into the identified content for underlayment.

8. The method of claim 7 wherein the action performed upon the webpage responsive to the rule associated with the identified value of the populated underlayment is one or more of the following: the webpage transitions to stop playing; the webpage transitions to a second webpage, or an overlayment appears.

9. A computer device comprising:
    a processor; and
    memory comprising processor-executable instructions that when executed by the processor cause performance of operations, the operations comprising:
        identifying content to underlay the content of a webpage displayed through a user interface;
        creating a temporary array;
        populating the temporary array with the identified content for underlayment;
        responsive to an input, transforming the temporary array into a populated webpage underlayment;
        tracking the position of a pointer with respect to the populated underlayment;
        renting the underlayment to a content creator, wherein the underlayment is rented by a time domain, and
        wherein, responsive to receiving an input while the position of the pointer corresponds to a portion of the populated underlayment, transforming coordinates of the position of the pointer into a lookup value, identifying a value of the populated underlayment corresponding to the lookup value, and performing an action upon the webpage responsive to a rule associated with the identified value of the populated underlayment.

10. The computing device of claim 9 wherein the time domain is a day, hour, minute, or second.

11. The computing device of claim 9 wherein the populated underlayment is populated with a digital video.

12. The computing device of claim 9 wherein the rule associated with the identified value of the populated underlayment is one or more of the following: the populated underlayment stops playing; the visitor is taken to another webpage; or an overlayment appears.

13. A non-transitory machine readable medium having stored thereon processor-executable instructions that, when executed, cause performance of operations, the operations comprising:
    identifying content to underlay the content of a webpage displayed through a user interface;
    creating a temporary array;
    populating the temporary array with the identified content for underlayment;
    responsive to an input, transforming the temporary array into a populated webpage underlayment;
    renting the underlayment to a content creator, wherein the underlayment is rented by a time domain;
    tracking a position of a pointer; and
    responding to an input while the position of the pointer corresponds to a position on the underlayment through which a video is rendered:
        transforming the coordinates of the position of the pointer into a lookup value;
        applying rules based on the value of the array position of the underlayment and the lookup value.

14. The non-transitory machine readable medium of claim 13, wherein the rules applied are one or more of the following: a sound is played; a video is played; a visitor is directed to another webpage; or an image of a visitor is incorporated into identified content for underlayment.

* * * * *